United States Patent [19]
Dyntar

[11] 3,834,617
[45] Sept. 10, 1974

[54] PID CONTROLLER FOR HEATING, VENTILATING AND AIR CONDITIONING SYSTEMS

[75] Inventor: Milos Dyntar, Steinhausen, Switzerland

[73] Assignee: Landis & GYR AG, Zug, Switzerland

[22] Filed: May 14, 1973

[21] Appl. No.: 359,919

[52] U.S. Cl. .................. 236/1 C, 165/26, 236/46, 236/78, 251/129
[51] Int. Cl. ............................................. G05b 11/42
[58] Field of Search .......... 236/1 C, 78, 46; 165/26; 251/129

[56] References Cited
UNITED STATES PATENTS

| | | | |
|---|---|---|---|
| 2,972,446 | 2/1964 | White | 236/78 X |
| 3,240,428 | 3/1966 | Umrath | 236/78 |
| 3,738,609 | 6/1973 | Divigard | 236/78 X |

Primary Examiner—William E. Wayner
Attorney, Agent, or Firm—Burns, Doane, Swecker & Mathis

[57] ABSTRACT

A heating and/or air conditioning system including a novel controller of the PID type. A proportional integrator (PI) circuit is arranged to receive the output signal from a differentiator (D) circuit which has been delayed and inverted in a summing circuit together with an input control signal to thereby provide a PID controller having a negative delayed D influence. Such controllers are sometimes referred to as a PI-minus-D controller. The circuit employs operational amplifiers and the time delay provided by the differentiator circuit is 7 minutes as compared with the time constant of approximately 2 minutes for the integrator and the PI portion of the circuit. The PID controller as disclosed operates through a broad range of frequencies between about 20 seconds and 50 minutes to produce a substantially optimum regulation of the fuel or heat exchanging medium control valve without the need for a separate field adjustment by the installation mechanic.

19 Claims, 3 Drawing Figures

3,834,617

PID CONTROLLER FOR HEATING, VENTILATING AND AIR CONDITIONING SYSTEMS

This invention relates to a PID-controller, and more particularly to a proportional integrator-minus-differentiator control circuit with time constants so selected that the controller is able to be used to control heating, ventilating and/or air conditioning systems without the need for internal adjustments of the control circuit dictated by the system time constants.

PID-controllers previously known have been used to provide an optimum regulation of temperature controlling systems. The prior known controllers have had a relatively narrow zone of system time constants, and it has been the practice to make an adjustment or setting of the controller parameters at the time of the installation of the controller in its particular location. These controllers have normally had a PI-plus-D behavior which means that the differentiator portion of the controller influences the proportional integrator portion of the controller in a positive sense. In heating, ventilating and air conditioning systems, a very broad band of system time constants ranging from approximately 20 seconds up to 50 minutes or so are encountered and it has not been considered possible to optimally adjust such a controller at its time of manufacture. It is desirable to manufacture a single controller for a large line of heating and air conditioning systems which have considerable variation in capacity in order to provide a quality controller at a sufficiently low price to allow it to be used in mass quantity.

The controllers are normally installed by mechanics who are not informed of the control parameters of the heating or air conditioning systems to be controlled and parameters of the controllers are accordingly adjusted based on the experience of a mechanic. As a result, many of the systems are not properly adjusted.

An important object of the present invention is to provide a novel PID controller that is so constructed that there is no need for the adjustment of the controller to regulate in an optimum fashion a heating or air conditioning system within the limit of the system time constants ordinarily encountered.

PI-minus-D controllers have been proposed on a theoretical basis in our Swiss Pat. No. 523,537, published July 14, 1972. While the disclosure in that patent contemplates a PI-minus-D controller employing certain concepts related to the present disclosure, the present invention provides a novel circuit arrangement for providing a proportional integrator controller having a negative differentiator influence where the time constant of the differentiator portion of the controller is from about two to five times larger than the time constant of the integrator portion of the controller. In addition, the present invention provides a novel circuit arrangement for producing a comparatively large differentiator time constant on the order of 5 – 10 minutes by use of operational amplifiers, and a novel arrangement of the proportional integrator circuit employing parallel branch circuits with the delay means in one of the branch circuits taking the form of an integrating circuit having a time constant on the order of 1 – 3 minutes.

It is accordingly a further object of the invention to provide a novel PID controller comprising a differentiator circuit having a delay circuit together with a feedback circuit having an amplifier whose gain is less than unity, the output signal of which is subtracted from a control signal and amplified with a large gain on the order of 25. The amplified output signal is delayed and inverted in one parallel branch circuit and combined with an unaltered signal in another parallel branch circuit. The combined output signal is applied together with the control signal in a summing amplifier circuit which serves as the input signal to the proportional integrating circuit. The broad banding effect to permit the novel control element of the present invention to be used in systems having widely varying system time constants is obtained when the time constant $T_D$ of the differentiator circuit is greater than the integral action time $T_N$ of the integrator circuit of the proportional integrator part of the controller.

It is a further object of the invention to provide a novel PID control element that has a PI-minus-D behavior in the sense that the differential circuit with its delay influences the proportional integrating portion of the circuit in a negative sense. The comparatively large dealy $T_D$ of between 5 and 10 minutes, or greater, provided by the differentiator circuit is, in accordance with a further subsidiary feature of the invention, achieved by the use of a novel circuit including a delay device having a delay $T_d$ on the order of only a minute, which is relatively easy to achieve by means of conventional operational amplifiers, connected in a unique manner, which controls both the gain of the circuit and its delay. The output signal of an operational amplifier, when summed with the undelayed signal, is fed through a feedback circuit having a predetermined gain $\beta$ which is applied to the summing amplifier that feeds the delay device having the time delay $T_d$. By controlling the relative gain $\alpha$ of the last mentioned summing circuit, the large time delay of between 5 and 10 minutes can be obtained by proper selection of the gain $\beta$ in the feedback circuit. By controlling the gain of the differentiator circuit and the gain $k$ of the input signal to the proportional integrator circuit, a control element of the PID type is provided which may be used without field adjustment with a variety of heating and/or air conditioning equipment in a large number of practical installations having a wide range of system time constants. Since field adjustments are not required, the need for the mechanic arranging for the installation to make any adjustments to the PID controller of thee present invention no longer exists, and yet the system being controlled will operate at or near its optimum performance capability.

These and other objects of the invention will become more fully apparent from the claims, and from the description as it proceeds in connection with the drawings wherein:

Figure 1:
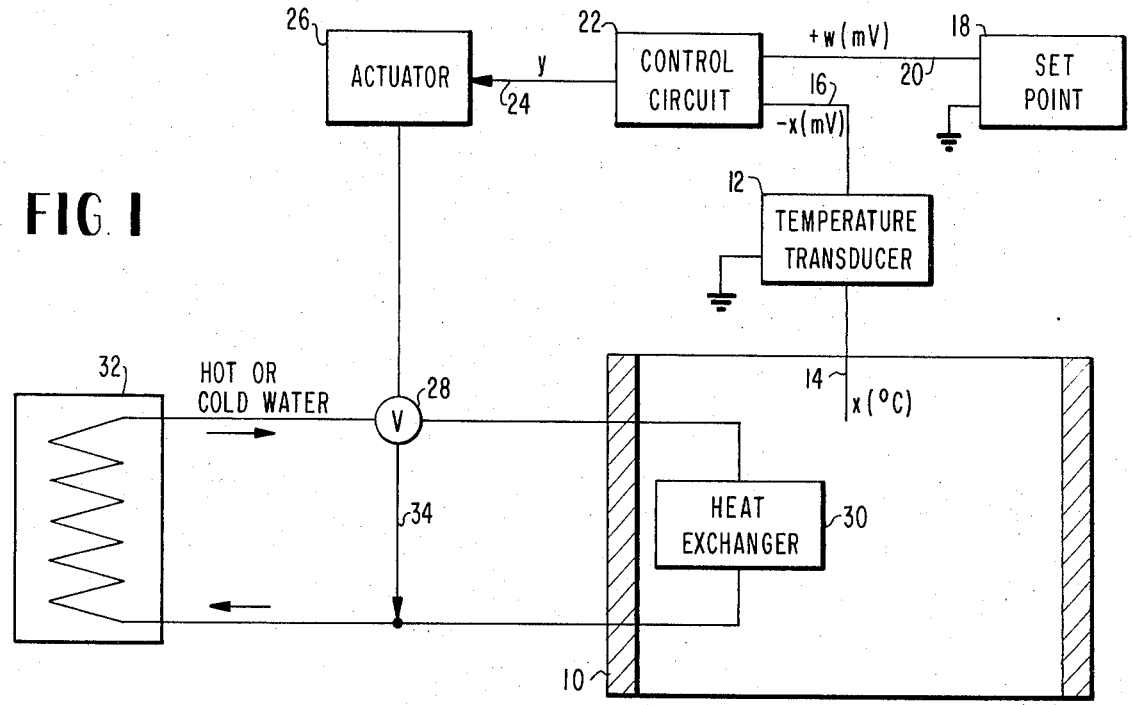
FIG. 1 shows a schematic diagram of the system of the present invention as applied to an installation requiring a heating, ventilating or air conditioning system.

Referring now to FIG. 1, the region whose temperature is to be controlled has walls 10. This region may be a room, or an air duct in the case of a forced air heating and cooling installation, and may include a temperature transducer 12 having a temperature sensing element 14 which in FIG. 1 is illustrated as detecting a temperature $x[°C.]$ The output signal from temperature transducer 12 is $-x[mV]$ on lead 16.

The system also contemplates the use of an apparatus for adjusting the desired temperature in the region confined by walls 10. In FIG. 1, a set point apparatus 18 is provided which produces on its output lead 20 an electrical signal designated $w[mV]$. The electrical signals on leads 16 and 20 are applied as input signals to a control circuit 22 which is diagrammatically shown in FIG. 2 and for which a detailed circuit diagram is shown in FIG. 3. The output signal y on lead 24 is applied to an actuator 26 for control valve 28.

Valve 28 is located in the pipeline between a heat exchanger 30 in the region whose temperature is to be controlled and a unit 32 which may provide either hot or cooled fluid, such as water, together with a suitable pump for causing circulation of the fluid to heat exchanger 30. A bypass line 34 may be provided so that in the event heat exchanger 30 does not demand further fluid, the fluid may be recirculated back into the unit 32, as is in common use. Alternatively, valve 28 could be the fuel valve on a heating furnace.

Figure 2:
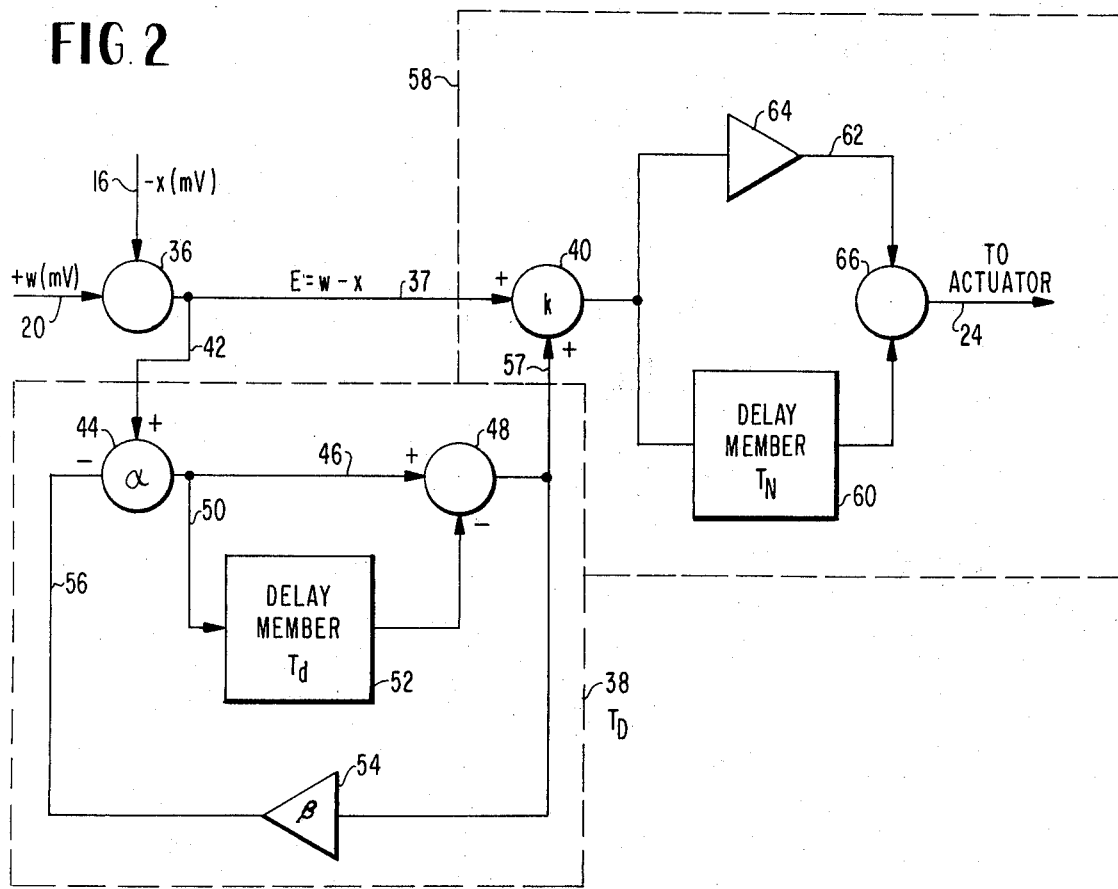
FIG. 2 is a schematic block diagram of the control circuit shown in FIG. 1 having a PID controller with the delayed negative D influence.
Figure 3:
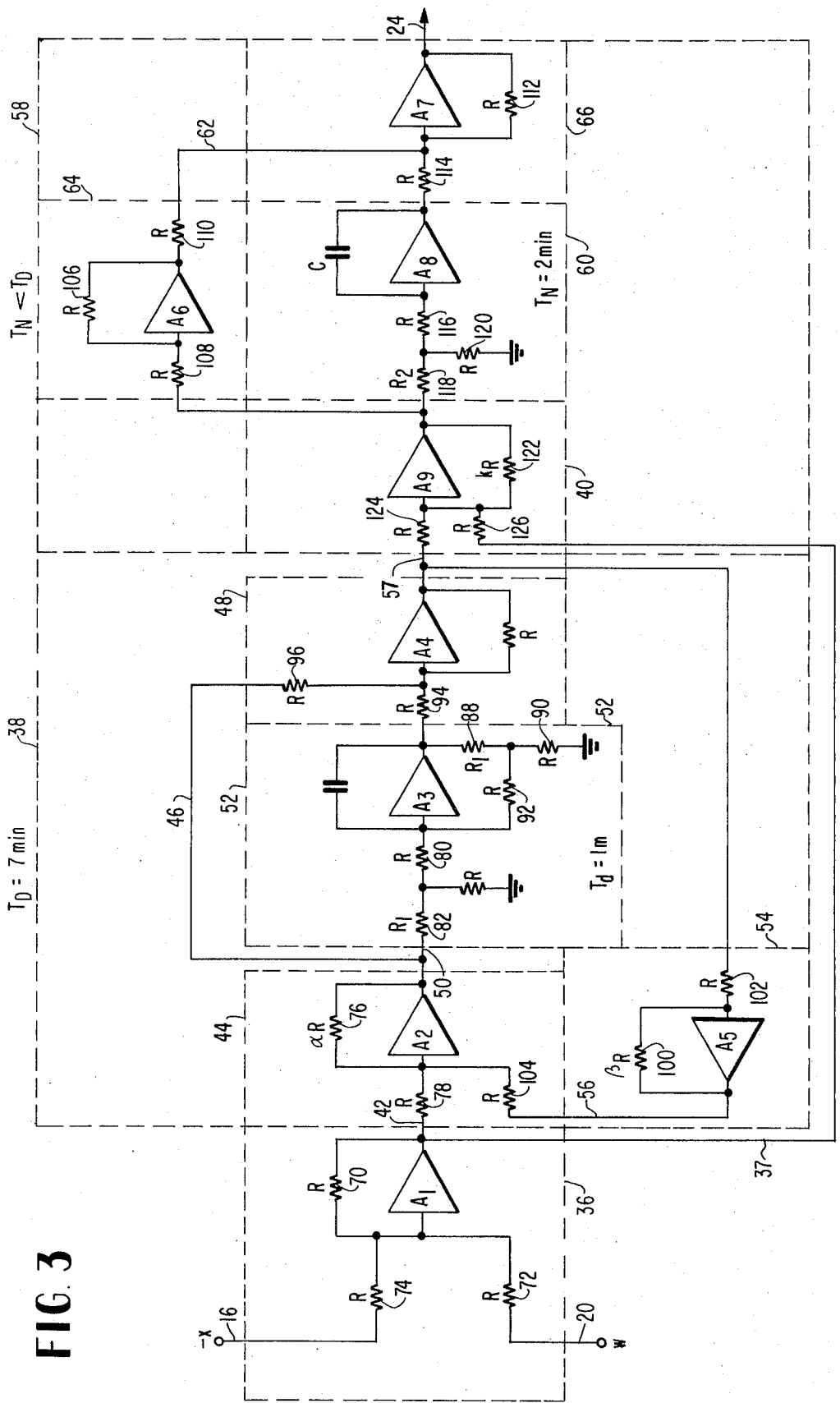
FIG. 3 is a circuit diagram of one arrangement implementing the block diagram of FIG. 2.

Referring now to FIG. 2, the input signals on lines 16 and 20 are applied to a first summing amplifier 36. The voltage output signal $E = w - x$ from summing amplifier 36 is applied to lead 37 directly to summing amplifier 40, and on lead 42 as one input to summing amplifier 44. The output from summing amplifier 44 is applied on lead 46 to summing amplifier 48, and on lead 50 to a delay member 52. The output of delay member 52 is applied as an input to summing amplifier 48, but with a polarity opposite that of the signal on lead 46.

From summing amplifier 48, a first output signal is applied to a feedback circuit including an amplifier 54 having a gain $\beta$ and whose output is applied on lead 56 to the input of summing amplifier 44, but with a polarity opposite that of the signal on lead 42. The output from summing amplifier 48 is applied as an input on lead 57 to summing amplifier 40.

Those circuit components within the dotted line 38 form a differential or D controller part of the control circuit 22.

The proportional integrator (PI) portion of the control circuit 22 shown in dotted line 58 includes parallel branch circuits, one of which includes a delay member 60 and the other branch 62 a proportional amplifier 64, as illustrated. The output signals from the two branch circuits 60 and 62 are combined in a summing circuit 66 whose output signal on lead 24 is applied to actuator 26 as shown in FIG. 1.

The schematic block diagram shown in FIG. 2 illustrates an embodiment of the present invention employing the concept of a negative delayed differential effect (D-influence) upon the proportional integration (PI-part) of the controller. The signs and definitions as used herein are defined as follows:

$P$ = proportional circuit;
$I$ = integrator circuit;
$D$ = differentiator circuit;
$p$ = Laplace operator;
$T_D$ = time delay of the differentiator circuit (rate time);
$T_N$ = time delay (reset time) of the integrator circuit;
$T_I$ = reset time of the PID-controller;
$H_V$ = D-influence;
$w$ = set point or desired value of the temperature to be controlled;
$x$ = actual value of the temperature as measured;
$\epsilon$ = amplification factor of the delayed differentiator circuit;
$W_{(p)}$ = transmission function of the PI-minus-D controller;
$G_{(p)}$ = transmission function of the delayed differentiator circuit;
$k_R$ = amplification factor of PI circuit.

The PID controller theoretically could be constructed to have a PI circuit connected in parallel with a delayed differentiator circuit with the input being fed by the deviation signal $E = w - x$. The outputs of the two parallel circuits could be connected to a summing amplifier, whereby the signal from the differentiator circuit is very much delayed and negative so that it is subtracted from the positive signal of the PI circuit.

This is contrary to the known circuit arrangements, which can be seen for example on page 303 of the book of Winfied Oppelt: *Kleines Handbuch Technischer Regelvorgänge*, 5th Edition. The transient response and the frequency response of known circuit arrangements with PI-plus-D behavior are shown on page 238 of the same book. The delayed negative output signal of the differentiator circuit causes the desired negative behavior of the PID controller, and the controller becomes a PI-minus-D controller, as distinguished from prior PID controllers.

Theoretically, the phenomenon of a PI-minus-D controller can be shown by means of the transmission function of such a PI-minus-D controller that is:

$$W_{(p)} = k_R [1 + 1/p \cdot T_I - H_V \cdot p \cdot T_D \, 1/1 + p \cdot T_D] \quad (1)$$

where the terms have the definitions given above. The third expression of the transmission function in brackets that forms the differentiator part is provided, as can be seen, with a negative sign and comprises a delay $1/1+p \cdot T_D$. This means that the differentiator portion is delayed by an amount determined by the time constant $T_D$ and influences the PI-portion of the controller in the negative sense.

The delay $1/1+p \cdot T_D$ can be produced by known circuit arrangements with a very short time constant $T_D$. The parallel circuit arrangement just described, while theoretically the simplest, has been most difficult to realize. The relatively large values of $T_I$ and $T_D$, in terms of several minutes, cannot be realized without comparatively complicated circuits, or their realization requires very expensive components. For these reasons, this solution is not applicable for the construction in mass quantities for inexpensive PI-minus-D controllers, which is one of the objects of the present invention.

It has been surprisingly discovered that the desired PI-minus-D controller can be achieved by implementation of the block diagram shown in FIG. 2, by the circuit of FIG. 3, in which all parts outlined in dashed lines corresponding to parts of the FIG. 2 configuration have the same reference numerals.

The controller of FIG. 3 comprises proportional integrating circuit 58 with a summing amplifier circuit 40 connected to its input. The PI circuit 58 is fed by the deviation signal $E = w - x$ directly from lead 37, and through the differentiator circuit 28 whose delayed output signal is connected to the input of the summing amplifier 40 as well. The differentiator circuit 38 comprises in principle a delay circuit 52 on the first order connected to the output of summing amplifier circuit 44 and with summing amplifier 48 connected to receive its output signal. The output signal from summing amplifier 44 on lead 46 is also connected directly as another input to summing amplifier 48. Feedback from the output of summing amplifier 48 is through a circuit including amplifier 54 to the input of summing amplifier 44.

The differentiator circuit arrangement as illustrated in FIG. 3 permits the use of a delay circuit 52 having a short time constant $T_d$ and nevertheless provides a total time constant $T_D$ of the differentiator circuit 38 to be as large as needed to control the technical properties of the PI-minus-D controller by means of the amplification factor $\alpha$ of the summing amplifier 44 and of the amplification factor $\beta$ of the amplifier 54. The differentiator circuit 38 of FIG. 3 has the following transmission function:

$$G_{(p)} = \alpha' \, p \cdot T_D/1 + p \cdot T_D \tag{2}$$

Wherein $$\alpha' = \alpha/1 + \alpha \cdot \beta \text{ and } T_D = T_d \, (1 + \alpha \cdot \beta)$$

The transmission function of the PI-minus-D controller connected in such a manner may be mathematically described as follows:

$$W_{(p)} = k \, T_N + \alpha' \, T_D/T_N \, [1 + 1/p(T_N + \alpha' \, T_D) - \alpha' \, T_D - T_N/T_N + \alpha' \, T_D \cdot p \cdot T_D/1 + p \cdot T_D] \tag{3}$$

The comparison of the coefficients with the transmission function, see equation 1) above, shows that $$k_R = k \, T_N + \alpha' \, T_D/T_N, \, T_I = T_N + \alpha' \cdot T_D, \text{ and}$$

$$H_V = \alpha' \, (T_D - T_N)/T_N + \alpha' \cdot T_D$$

The D-influence $H_V$ must fulfill the following unequality: $0 \leq H_V \leq 1$.

Accordingly, the differentiator time constant $T_D$ of the differential circuit 38 must be greater than the time constant or integral action time $T_N$ of the integrator circuit 60 part of the proportional integrator circuit 58. In the preferred embodiment disclosed, the following values were obtained: $T_D = 7$ min, $T_N = 2$ min and $T_d = 1$ min.

FIG. 3 is a circuit diagram of a preferred embodiment of a PID controller with a negative D-influence. The summing amplifier comprises a conventional operational amplifier $A_1$ having the output connected across a resistor 70 to its input. The amplifier $A_1$ is fed through resistors 72 and 74 by the nominal value w and by the actual value $-x$ of the variable to be controlled, respectively, and forms the deviation signal $E = w - x$ on leads 37 and 42. The summing amplifier 44 includes an operational amplifier $A_2$ which has a feedback circuit including resistor 76 whose value is $\alpha R$ as discussed below. The input of the operational amplifier $A_2$ is connected via resistor 78 to the output of amplifier $A_1$.

The output of the summing amplifier 44 is connected to the input terminal of delay circuit 52 of the first order, which has an operational amplifier $A_3$ with its output connected to its input across a capacitor C and with its input connected via resistor 80 and a further resistor 82 connected in series, to the output of the summing amplifier 44. The connecting point of both series resistors 80 and 82 is connected to ground through resistor 84. The output of the operational amplifier $A_3$ is connected to ground through a series circuit including resistors 88 and 90, the connecting point of which is connected via further resistor 92 to the input of the operational amplifier $A_3$.

The output of the operational amplifier $A_3$ is connected via resistor 94 to the input of an operational amplifier $A_4$ and coupled across resistor 96 and lead 46 to its own input at the output of the summing amplifier 44.

The differentiator circuit 38 has further an amplifier 54 with an amplification factor $\beta$, comprising an operational amplifier $A_5$ with its output connected across resistor 100 to its input, its input being connected via resistor 102 to the output of operational amplifier $A_4$ and its output connected through resistor 104 to the input of operational amplifier $A_2$.

The proportional integrator circuit 58 comprises two parallel branch circuits, one including a proportional amplifier 64 and the other including an integrator circuit 60 with an integral action time $T_N$. The signals from the two parallel branch circuits are applied to the input of a summing amplifier circuit 66 including operational amplifier $A_7$. The input signal to the two parallel branch circuits is from a summing amplifier 40 with the amplification factor k, connected as the input terminals of the proportional integrator circuit 58. The proportional amplifier 64 has an operational amplifier $A_6$ with its output connected via resistor 106 to its input, this input being connected through a resistor 108 to the output of the summing amplifier 40, and its output through a resistor 110 to the input of operational amplifier $A_7$ of the output amplifier 66. The output of the operational amplifier $A_7$ is connected across a resistor 112 to its input.

The integrator circuit 60 comprises an operational amplifier $A_8$ with the output connected across capacitor C to its input, and through resistor 114 to the input of operational amplifier $A_7$ as well. A series circuit comprising resistors 116 and 118 is connected between the input of the operational amplifier $A_8$ and the output of the operational amplifier $A_9$ of the summing amplifier 40, the connecting point of both resistors 116 and 118 being connected to ground through resistor 120.

The summing amplifier 40 with an amplification factor k has an operational amplifier $A_9$ with its output connected via resistor 122 to its input, this input being connected through resistor 124 to the output of the differentiator circuit 38 and via further resistor 126 to the output of summing amplifier 36 containing the signal $E = w - x$. The output signal on lead 24 from the output of summing amplifier 66 is coupled to the actuator 26 for valve 28, as shown in FIG. 1.

The components shown in the circuit of FIG. 3 may have the following values:
$R = 10^5$ ohms
$R_1 = 6 \cdot 10^6$ ohms
$R_2 = 12 \cdot 10^6$ ohms
$C = 10 \cdot 10^{-6}$ F
$\alpha = 25$
$\beta = 0.24$
$k = 2.5$
$T_d$ of the delaying circuit 52 is approximately 1 min.

$T_D$ of the differentiator circuit is approximately 7 min.

$T_N$ of the integrator circuit 60 is approximately 2 min.

The properties of the PI-minus-D controller according to the invention are very advantageous for heating, ventilating and air conditioning systems. Such systems have an increasing time constant as the difficulty of the control task decreases. With fast systems, which are more difficult to control, the lower values of the amplification and of the integral action time are necessary for an optimum control to be achieved. Also, with fast systems, the higher frequencies are more effective. With slow systems, which are easier to control, greater values of the amplification and of the integral action time are needed for optimum control. With slow systems, the lower frequencies are more effective.

For these reasons, the high frequency controller, having lower values of the amplification and of the integral action time, is more effective with fast systems. A low frequency controller, having greater values of the amplification and of the integral time, is more effective with slow systems. The present invention, because of its unique PI-minus-D control system provides both modes of operation and therefore makes possible an optimum control of heating, ventilating and air conditioning systems within a broad limit of their time constants without the need for adjusting the control circuit after installation.

The parameters of the controller according to the invention are preadjusted in the production for all heating, ventilating and air conditioning systems. During the fitting up of the controller to the system to be controlled, only the connections need to be made as the adjustment of each single controller to the actual system to be controlled is not necessary. The set point adjustment of transducer 18 is made from time to time as changes in the room temperature may be desired. The PID controller according to the invention also results in the saving of fuel. The amount of fuel used as energy source in heating or cooling installations is influenced by the function of the controller. The controller of the present invention reduces the tendency of the fuel consuming unit to cycle on and off, and this without the need for the controllers to be separately adjusted without knowledge of system parameters by mechanics according to their experience. The fuel is utilized in a more efficient manner, thus resulting in savings for energy costs.

The present invention may be embodied in other specific forms without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and intended to be covered by Letters Patent is:

1. Apparatus for controlling the temperature in an enclosed region through regulation of heat exchanger media by actuation of a valve which determines a flow rate comprising:
    means for generating a first electrical signal corresponding to the temperature in said region;
    means for generating a second electrical signal corresponding to the desired temperature for said region; and
    circuit means for controlling said valve including:
    a first summing amplifier for generating a first control signal proportional to the difference between said first and second electrical signal voltages;
    a delay circuit including amplifier means for producing an amplified output signal with a first time delay, and circuit means for connecting said delay circuit to receive said first control signal;
    a second summing amplifier for generating a second control signal connected to receive said first control signal and said delay circuit output signal; and means including parallel branch circuits for generating an output signal to control said valve and connected to receive said second control signal, an integrating circuit in one of the branch circuits having a second time delay that is shorter than said first time delay, and an amplifier circuit in the other branch circuit.

2. Apparatus of claim 1
    wherein the delay circuit includes a third summing amplifier having a predetermined gain $\alpha$ with two input signal channels and one output signal channel, a delay circuit having a time delay connected to said output signal channel, a fourth summing amplifier having two input signal channels one of which is connected to said output signal channel and the other connected to the output of said delay circuit, a feedback circuit including an amplifier circuit having a predetermined gain $\beta$ connected to receive the output signal from said fourth summing amplifier circuit and to have its output signal supplied to one of the signal channels in said third summing amplifier;
    wherein the first control signal is applied to the other signal channel in said third summing amplifier; and wherein the output signal from the fourth summing amplifier circuit is connected as one input to said second summing amplifier.

3. Apparatus of claim 2, characterized by the first time delay being substantially equal to the product of the time delay and said delay circuit and $(1 + \alpha\beta)$.

4. Apparatus of claim 3
    wherein the time delay of said delay circuit is approximately 1 minute; $\alpha$ is approximately 25; and $\beta$ is approximately 0.24.

5. Apparatus of claim 4
    wherein said second time delay of said integrating circuit is approximately 2 minutes.

6. Apparatus of claim 1 wherein the first time delay is between about 5 and 10 minutes and the second time delay of said integrating circuit is at least 1 minute.

7. Apparatus of claim 2 wherein the polarity of the signal output from said delay circuit is opposite from the polarity of the output signal from said third summing amplifier when applied to said fourth summing amplifier and the polarity of the signal from said feedback circuit is opposite from the polarity of the first control signal when applied to said third summing amplifier.

8. Apparatus of claim 7 wherein the polarity of the second control signal is the same as the polarity of the first control signal when applied to said second summing amplifier.

9. Apparatus of claim 8 wherein the first time delay is substantially equal to the product of the time delay of said delay circuit and $(1+\alpha\beta)$; the time delay of said delay circuit is approximately one minute; $\alpha$ is approximately 25; $\beta$ is approximately 0.24; and the second time delay of said integrating circuit is approximately 2 minutes.

10. A proportional integrator and differentiator control element adapted for regulating a valve controlling the influence of a heating or cooling member in a heating, ventilating or air conditioning system in response to a differential signal voltage proportional to the difference between a predetermined desired temperature and a measured temperature, said control element comprising:

a differentiator circuit having a differential time constant (rate time) $T_D$, said differentiator circuit including:
  a first input summing amplifier circuit having two input signal channels, an amplification factor $\alpha$ and output terminals with the differential signal voltage connected to one of said input signal channels;
  means applying the differential signal voltage to one of said input signal channels;
  a second summing amplifier circuit having two input signal channels and output terminals;
  a delay circuit having a time constant $T_d$;
  first circuit means for connecting the output terminals of said first input summing amplifier circuit to one of the signal channels of said second summing amplifier circuit;
  second circuit means for connecting the output terminals from said first input summing amplifier circuit to the input of said delay circuit; third circuit means for connecting the output signal from said delay circuit to the other signal channel of said second summing amplifier circuit; and
  a first amplifier circuit having an amplification factor $\beta$ and connected to have the output signal from said second summing amplifier as its input signal and connected to have its output signal applied to the other input signal channel of said first input summing amplifier circuit; and a proportional integrating circuit including:
  a third summing amplifier circuit having two input signal channels and a amplification factor $k$ and output terminals with the differential signal voltage connected to one of said input signal channels and the output signal from said second summing amplifier connected to said other input signal channel;
  a pair of branch circuits including a proportional amplifier circuit in one branch circuit and an integrator having an integral action time $T_N$ in the other branch circuit;
  means connecting the output signal from said third summing amplifier circuit to the input of said parallel branch circuits; and an output summing amplifier circuit connected to receive and combine the output signals from said parallel branch circuits and having output terminals adapted for connection to said control valve.

11. The control element of claim 10 wherein the differential circuit time constant $T_D$ is between about five and ten minutes and larger than the integral action time $T_N$ which is at least about one minute, and the signal from the differential circuit has a polarity so as to provide a control element having a proportional integrator function with a minus differentiator behavior to thereby provide a control element adapted for use without field adjustment with heating and air conditioning systems having a wide range of system time constants.

12. The control element of claim 11 characterized by the differential time constant (time rate) $T_D$ being substantially equal to the product of the delay circuit time constant $T_d$ and $(1 + \alpha\beta)$.

13. The control element of claim 10 wherein the polarity of the output signal from said delay circuit is opposite from the polarity of the output signal from said first summing amplifier circuit when applied to said second summing amplifier circuit, and the polarity of the output signal from said first amplifier circuit is opposite from the polarity of the differential signal voltage applied when applied to said first summing circuit.

14. The control element of claim 13 wherein the polarity of the differential signal voltage is the same as the polarity of the output signal from said second summing amplifier when applied to the input signal channels of said third summing amplifier.

15. A method for controlling the temperature in an enclosed region through regulation of heat exchanger media by actuation of a valve which determines flow rate comprising:
  generating a first electrical signal corresonding to the temperature detected in said region;
  generating a second electrical signal corresponding to the desired temperature for said region;
  amplifying the sum of said first control signal and a feedback signal by amount $\alpha$, applying the amplified signal to a first delay circuit which produces a delay on the order of a minute, substituting the delayed signal from said amplified first control signal to provide a minus D signal, and amplifying said minus D signal by an amount $\beta$ to produce said feedback signal whereby the minus D signal has an effective delay at least five times greater than the delay provided by said first delay circuit;
  summing said first control signal and said minus D signal and amplifying said summed signals by an amount k to provide a second control signal;
  delaying said second control signal in one of two parallel branch circuits by an amount greater than the delay provided by said first delay circuit but less than the effective delay of said minus D signal; and
  summing said second control signal with the delayed second control signal to produce an output signal voltage for actuating said valve.

16. The method of claim 15 wherein $\alpha$ is about 25; $\beta$ is about 0.24; $k$ is about 2.5; the delay of said minus D signal is between about 5 and 10 minutes; and the delay of said second control signal is at least 1 minute.

17. A method for producing a control voltage signal for regulating a valve which influences the control of a heating or cooling member in an air conditioning system in response to a differential signal voltage proportional to the difference between a predetermined desired temperature and a measured temperature comprising:

provi̇ding two signal channels for said differential signal voltage and combining the output signals in a summing amplifier circuit so that the output signal from one signal channel is subtracted from the output signal from the other signal channel;

amplifying and delaying for a period of several minutes said differential signal voltage in one of said signal channels;

feeding the summing amplifier circuit output signal into two parallel branch circuits;

delaying said output signal in one of said parallel circuits by an amount less than the delay of the signal voltage in said one signal channel; and summing the output signals from said two parallel branch circuits to produce said control voltage signal.

18. The method as defined in claim 17 wherein said delayed signal is provided by amplifying a combined signal including the differential signal voltage and a feedback signal voltage;

delaying the amplified combined signal for a period of about 1 minute;

subtracting the delayed signal from the amplified combined signal; and amplifying by an amount $\beta$ the resulting signal produced to provide said feedback signal voltage.

19. The method as defined in claim 18 wherein the feedback signal voltage amplification $\beta$ is less than unity and the feedback signal voltage is subtracted from said differential signal voltage before being amplified, and the amplification factor for said combined signal is about 25.

* * * * *